United States Patent

Nachazel et al.

[15] 3,641,922
[45] Feb. 15, 1972

| [54] | MULTIPURPOSE COOKING GRILL |
|---|---|
| [72] | Inventors: Thomas Stanley Nachazel; John Stanley Nachazel, both of 2061 E. Floyd Avenue, Englewood, Colo. 80110 |
| [22] | Filed: Mar. 19, 1970 |
| [21] | Appl. No.: 20,976 |
| [52] | U.S. Cl. ................99/340, 99/400, 99/422, 99/446, 126/9 B, 126/25 A, 126/30 |
| [51] | Int. Cl. ....................................A47j 37/07 |
| [58] | Field of Search............99/339, 340, 385, 393, 400, 99/402, 446, 450, 422, 449, 425; 126/9, 9 A, 9 B, 25, 25 A, 30; 211/176, 181; 287/58 CT; 248/157, 411, 413 |

[56] References Cited

UNITED STATES PATENTS

| 2,604,884 | 7/1952 | Walker | 126/30 |
|---|---|---|---|
| 3,094,113 | 6/1963 | Avila | 126/9 X |
| 406,196 | 7/1889 | Clayton et al. | 248/413 |
| 2,827,846 | 3/1958 | Karkling | 126/30 X |
| 3,355,134 | 11/1967 | Chesley | 211/134 |
| 24,752 | 7/1859 | Morrel | 99/339 |
| 2,977,953 | 4/1961 | Dowdy | 126/30 |

Primary Examiner—Billy J. Wilhite
Attorney—McGrew and Edwards

[57] ABSTRACT

A cooking grill of the type for both indoor use over the fire on the grate of a fireplace and outdoor use over an open fire comprises a forward post which is adjustable in height, a grid extending horizontally from the top of the post, and a plate extending horizontally from the bottom. The post comprises overlapping half sections and is provided with an insulated handle threaded on a stud attached to the top half section and slidable along a slot in the bottom section, the post sections are clamped together by tightening the handle and quick adjustment during use is facilitated by the handle assembly.

10 Claims, 5 Drawing Figures

PATENTED FEB 15 1972　3,641,922

INVENTORS
THOMAS S. NACHAZEL
JOHN S. NACHAZEL
BY
ATTORNEYS

MULTIPURPOSE COOKING GRILL

This invention relates to portable cooking grills and particularly to an improved portable grill of the type usable over outdoor fires and over indoor grates.

Many types of portable cooking grills have been provided heretofore for use over indoor and outdoor fires, these have included one type of grill which has a bottom support or base which may be positioned below a grate in a fireplace and which has an upper grid or grill secured to a post attached to the base and arranged to project over the fire in the grate, such grids may be made to be adjustable vertically to selected positions along the post. These alternative-use grills have been found generally useful but have not proved entirely satisfactory for all applications. Accordingly, it is an object of the present invention to provide an improved portable grill assembly for alternative fireplace and outdoor use.

It is another object of this invention to provide a readily portable grill for use over a fireplace grate and also for use over an outdoor fire including an improved arrangement for assuring a free and unobstructed cooking surface and ready adjustment of the height of the grill.

Briefly, in carrying out the objects of this invention in one embodiment thereof, a portable grill is provided which comprises a pan having upturned flanges and acting as a base and to which is detachably secured an upright post adjacent the middle of one edge thereof. A parallel wire support grill is carried by the post on a second section of the post which is retained and slidably mounted between flanges on the first section; the grill is detachably secured to the post which holds it in parallel relationship to the baseplate and extending in the same direction from the post. Both the plate and the grill are secured at the respective outer ends of the post and the two sections of the post are adjustable with respect to one another, a handle being secured on a threaded stud attached to the post section carrying the grill and passing through a vertical slot in the lower section of the post. The handle is readily turned to loosen the clamping action and the height of the grill above the plate thus is quickly adjustable by movement of the handle along the vertical slot and the reclamping of the post sections by screwing the handle tightly into position. The handle is insulated and extends forwardly from the post where it is readily available for manipulating the portable grill assembly as well as for adjusting the height of the grill. The top of the grill is free from obstructions and the wires extend parallel to one another from the front edge to the rear edge thereof and slightly beyond where they turn upwardly to provide stop members for use during cooking on the grill to prevent food from being pushed inadvertently off the grill.

The features of novelty which characterize this invention are pointed out with particularity in the claims annexed to and forming a part of this specification. The invention itself, however, both as to its organization and the manner in which it is used, together with further objects and advantages thereof, will best be understood upon reference to the following description taken in connection with the accompanying drawing in which:

Figure 1:
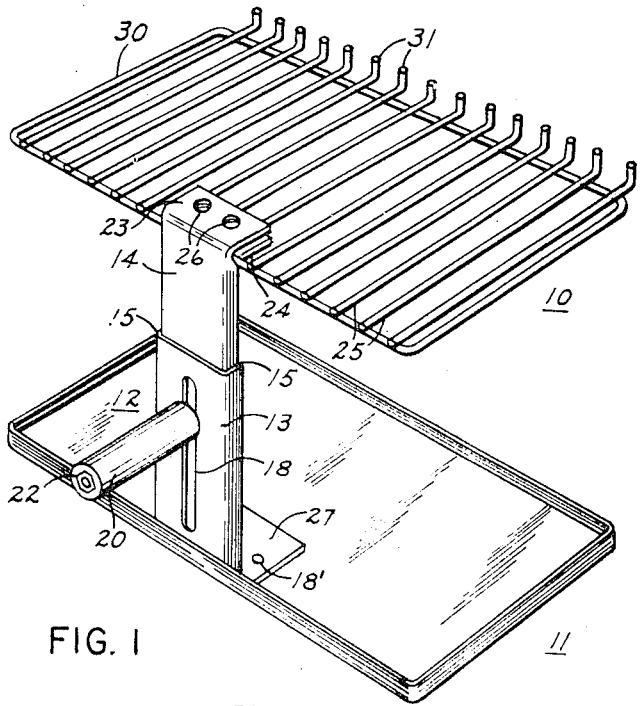
FIG. 1 is a perspective view of a portable grill assembly embodying the invention.
Figure 2:
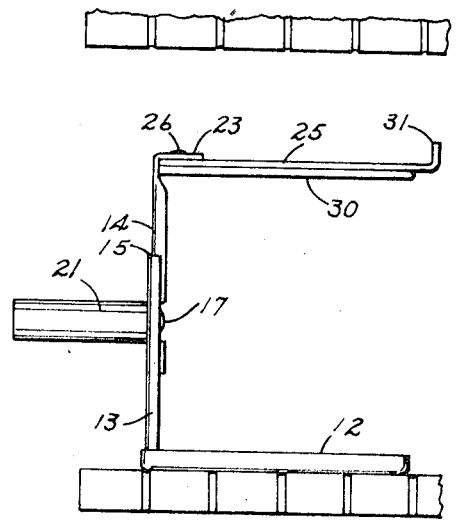
FIG. 2 is an end elevation view of the grill of FIG. 1.
Figure 3:
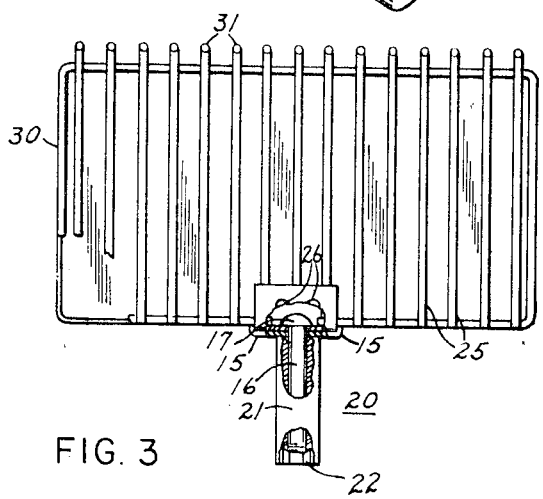
FIG. 3 is a top plan view partly broken away of the grill of FIG. 1.

Referring now to the drawing, the grill as illustrated in FIGS. 1 through 4 comprises a wire grid 10 mounted on a base 11 on a rigid upright post 12. The post comprises a lower section 13 detachably secured to the plate 11 and an upper section 14 detachably secured to the grid 10. The post is located at the forward edges of the grid and of the plate leaving the full areas of the grill and plate free for positioning the grill over a fire either in a grate of a fireplace or outdoors on the ground. The plate is also useful for holding the hot coals and affords movement of the grill and fire during use. Thus, the grill may be used either outdoors or in the fireplace with the fire supported on the pan or on the grid and without using a separate grate.

The lower post section 13 is provided with vertical rearwardly inturned flanges or guides along its sides as indicated at 15 and the lower portion of the upper post 14 fits between the guides 15 and is slidable within the section 13 along these guides. The two sections are locked together by a threaded stud or bolt 16 illustrated as a carriage bolt inserted through the rear of the section 14 and having a square base on its head 17 fitted in a square hole in the post 14 or otherwise held against rotation with respect to the post; the bolt extends through a vertical slot 18 located centrally in the section 13. The two sections are clamped together by turning the handle 20 into place tightly against the plate 13 so that the two sections are securely held together. The handle 20, as illustrated, comprises a body portion 21 which may be of wood or heat-insulating plastic and which is provided with a central bore to accommodate the bolt 16. A nut 22 is securely fastened in the outer end of the handle and threadedly engages the bolt or stud 16. It will now be apparent that the handle may readily be released by turning it to move it outwardly on the bolt; the relative positions of the post sections 13 and 14 may then be changed by sliding them with respect to one another as desired and the handle then turned to tighten it and reclamp the post sections in their new positions. In this manner the height of the grill 10 over a fire or grate may easily be adjusted while the grill assembly is in position. At the same time, the post assembly provides a rigid support for the grill with respect to the plate 11. The section 14 of the post is provided with an upper inturned flange 23 and the grill 10 is clamped between the flange 23 and a plate 24 positioned below the cross wires of the grill indicated at 25, bolts 26 being employed to securely clamp the wires between the flange and plate and hold these elements in position. In a similar manner the lower section 13 of the post 12 is provided with an inturned flange 27 which is attached to the plate 11 by bolts 18'. The entire assembly may thus easily be taken apart and packed in a small space by removing the bolts 26 and 18' and the handle 20. The grill comprises a main frame 30 of rectangular configuration and the wires 25 extend in parallel relationship with one another from the front edge of the frame 30 and over the rear edge thereof; the rear ends of the wires extend somewhat beyond the rear edge of the frame where each of the wires 25 is provided with an upturned end 31. The wires 25 are preferably welded to the frame 30 at each contact point to hold them rigidly in position.

It will now be apparent that the upper surface of the grill is free from obstructions which might interfere with the manipulation of cooking tools and food on the grill. Regardless of the position of adjustment of the post 12, the grill is free from interference by any parts of the assembly.

Figure 5:
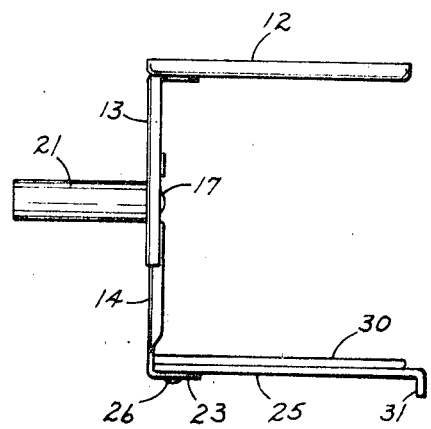
FIG. 5 is an end elevation view similar to FIG. 2 showing the grill in its inverted position.
Figure 4:
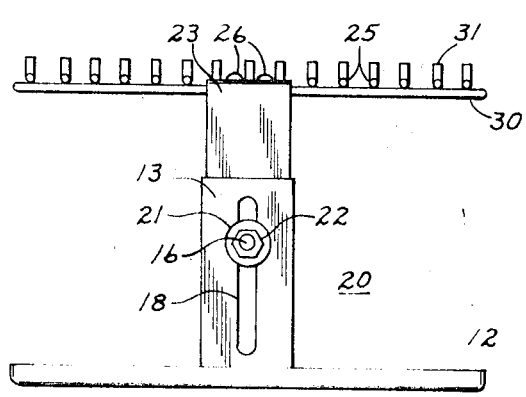
FIG. 4 is a front elevation view of the grill.

The base 12 constitutes a shallow pan and for some cooking operations is useful for collecting grease from food being cooked. In FIG. 5, the assembly is shown inverted so that the base 11 is at the top, it being turned over with respect to the post section 13 so that its flanges extend upwardly and provide a shallow pan suitable for the cooking of bacon, for example, and which when positioned to be level holds the bacon fat and prevents its dripping onto the fire below. Adjustment of the height of the pan 11 is effected in the same manner as the adjustment of the grill when the assembly is arranged upright as shown in FIG. 1.

During the use of the grill indoors, the assembly may be placed with the base 11 under the grate and the grill 10 positioned over the fire in the grate, in a similar manner, when the assembly is being used outdoors, fire may be built below the grill 10 with the pan or base 11, or in the inverted position of FIG. 5, the fire may be built on the grill 10 under the base pan 11. The grill wires may be closely spaced from one another and then either the pan 11 or the grill 10 may support the fire so that the grill is made portable with the fire remaining in it without having to be rebuilt. Furthermore, the assembly is such that the outdoor fire may first be built and then when the coals are in the desired heating condition, the base 11 inserted under the coals and the height of the grill 10 adjusted to the optimum position for cooking.

We claim:

1. A food-cooking support for alternatively holding food over an outdoor fire and over a fireplace fire comprising a vertical post having overlapped front and rear relatively adjustable sections for changing the height of the post, means for preventing relative rotation of said sections with respect to one another, a grill attached to and extending horizontally away from one of said sections at the outer end thereof, a bottom support member attached to and extending horizontally from the outer end of the other of said sections, a vertical slot in said front section, a threaded stud engaging said rear section and held against rotation with respect to said post and extending through said slot, and a handle extending horizontally from said post and threaded on said stud whereby said handle when tightened on said stud clamps said sections together and may readily be loosened to afford sliding adjustment of said sections with respect to one another for adjusting the height of said post.

2. A food-cooking support as set forth in claim 1 wherein said grill comprises a frame and horizontal parallel wires constituting the top surface of said grill and extending from the front to the rear of said grill and away from said post.

3. A food-cooking support as set forth in claim 2 wherein the rear ends of said grill wires extend beyond the rear edge of the frame and are turned upwardly to provide stops for facilitating the handling of food being cooked on the grill.

4. A food-cooking support as set forth in claim 1 wherein said bottom support comprises a detachable and reversible shallow pan with upwardly extending sidewalls whereby when said cooking support is reversed with said grill serving as the bottom support said pan may also be reversed to constitute a cooking pan for collecting melted fat formed therein.

5. A food-cooking support for alternatively holding food over an outdoor fire and over a fireplace fire comprising a vertical post comprising overlapped upper and lower relatively adjustable sections for changing the height of the post, said sections each being made of flat sheet metal, a grill attached to and extending horizontally away from one of said sections at the outer end thereof, a bottom support member attached to and extending horizontally from the outer end of the other of said sections, a vertical slot in one of said sections, a threaded stud engaging the other of said sections and passing through said slot, means for preventing relative rotation of said sections with respect to one another, means for preventing rotation of said stud with respect to said post, said stud extending outwardly from said post away from said grill and said support member, and a handle extending horizontally from said post and threaded on said stud whereby said handle when tightened on said stud clamps said sections together and may readily be loosened to afford sliding adjustment of said sections with respect to one another for adjusting the height of said post.

6. A food-cooking support as set forth in claim 5 wherein said grill comprises a frame and horizontal parallel wires constituting the top surface of said grill and extending from the front to the rear of said grill and away from said post.

7. A food-cooking support as set forth in claim 6 wherein the rear ends of said grill wires extend beyond the rear edge of the frame and are turned upwardly to provide stops for facilitating the handling of food being cooked on the grill.

8. A food-cooking support as set forth in claim 5 wherein said bottom support comprises a detachable and reversible shallow pan with upwardly extending sidewalls whereby when said cooking support is reversed with said grill serving as the bottom support said pan may also be reversed to constitute a cooking pan for collecting melted fat formed therein.

9. A food-cooking support as set forth in claim 5 wherein said means for preventing relative rotation of said sections with respect to one another includes portions of one of said sections on opposite edges thereof bent about the other of said sections to provide guides.

10. A food-cooking support as set forth in claim 5 wherein the means for attaching said grill and said bottom support to the respective ones of said post sections comprises end portions of each section bent to extend normal to the main portion thereof and means for attaching said bent portions to said grill and said bottom member respectively.

* * * * *